(12) United States Patent
Xiao et al.

(10) Patent No.: US 10,278,556 B2
(45) Date of Patent: May 7, 2019

(54) UPRIGHT VACUUM CLEANER

(71) Applicant: JIANGSU MIDEA CLEANING APPLIANCES CO., LTD., Suzhou (CN)

(72) Inventors: Xiahu Xiao, Suzhou (CN); Wei Hu, Suzhou (CN); Hui Zou, Suzhou (CN)

(73) Assignee: JIANGSU MIDEA CLEANING APPLIANCES CO., LTD., Suzhou (CN)

( * ) Notice: Subject to any disclaimer, the term of this patent is extended or adjusted under 35 U.S.C. 154(b) by 0 days.

(21) Appl. No.: 15/539,155

(22) PCT Filed: Mar. 4, 2016

(86) PCT No.: PCT/CN2016/075603
§ 371 (c)(1),
(2) Date: Jun. 23, 2017

(87) PCT Pub. No.: WO2017/096716
PCT Pub. Date: Jun. 15, 2017

(65) Prior Publication Data
US 2018/0263443 A1    Sep. 20, 2018

(30) Foreign Application Priority Data

Dec. 10, 2015  (CN) .......................... 2015 1 0917466
Dec. 10, 2015  (CN) .......................... 2015 1 0917497
(Continued)

(51) Int. Cl.
*A47L 9/04*    (2006.01)
*A47L 5/30*    (2006.01)
(Continued)

(52) U.S. Cl.
CPC .............. *A47L 9/0411* (2013.01); *A47L 5/22* (2013.01); *A47L 5/28* (2013.01); *A47L 5/30* (2013.01);
(Continued)

(58) Field of Classification Search
CPC ..... A47L 5/22; A47L 5/28; A47L 5/30; A47L 9/00; A47L 9/04; A47L 9/0411;
(Continued)

(56) References Cited

U.S. PATENT DOCUMENTS 2,037,648 A * 4/1936 Bergstrom ............ A47L 9/0411
                                                              15/179
2,221,745 A * 11/1940 Kirby ........................ A47L 5/10
                                                              15/324
(Continued)

FOREIGN PATENT DOCUMENTS

CN    1667197 A     9/2005
CN    2845692 Y    12/2006
(Continued)

OTHER PUBLICATIONS

CN 105065591 A—Nov. 2015—English Machine Translation.*
(Continued)

*Primary Examiner* — Marc Carlson
(74) *Attorney, Agent, or Firm* — Kilpatrick Townsend & Stockton LLP

(57) ABSTRACT

An upright vacuum cleaner (1) is provided, including a brushroll assembly (100), a motor assembly (200) and a body assembly (300). The brushroll assembly (200) includes a brushroll casing (12) and a brushroll (11). The motor assembly (200) includes a motor housing (21) and a motor (22), and the motor (22) drives the brushroll (11) to roll via a drive belt (13). The body assembly (300) includes a body (31) and a bridging member (32) mounted to the body (31),
(Continued)

and the bridging member (32) is pivotably connected with the motor housing (21) to allow the body (31) to be rotatable between an upright position and an oblique position. When the body (31) is rotated from the upright position to the oblique position, the bridging member (32) pushes the brushroll casing (12) to move in a direction running away from the motor housing (21) so as to tension the drive belt (13).

15 Claims, 8 Drawing Sheets

(30) Foreign Application Priority Data

| Dec. 10, 2015 | (CN) | 2015 1 0917498 |
|---|---|---|
| Dec. 10, 2015 | (CN) | 2015 1 0917499 |
| Dec. 10, 2015 | (CN) | 2015 1 0917528 |
| Dec. 10, 2015 | (CN) | 2015 1 0917653 |
| Dec. 10, 2015 | (CN) | 2015 1 0918541 |
| Dec. 10, 2015 | (CN) | 2015 1 0918544 |
| Dec. 10, 2015 | (CN) | 2015 1 0918580 |
| Dec. 10, 2015 | (CN) | 2015 1 0918662 |
| Dec. 10, 2015 | (CN) | 2015 2 1027156 U |
| Dec. 10, 2015 | (CN) | 2015 2 1027158 U |
| Dec. 10, 2015 | (CN) | 2015 2 1027550 U |
| Dec. 10, 2015 | (CN) | 2015 2 1028726 U |
| Dec. 10, 2015 | (CN) | 2015 2 1028730 U |
| Dec. 10, 2015 | (CN) | 2015 2 1028739 U |
| Dec. 10, 2015 | (CN) | 2015 2 1028779 U |
| Dec. 10, 2015 | (CN) | 2015 2 1028784 U |
| Dec. 10, 2015 | (CN) | 2015 2 1028812 U |
| Dec. 10, 2015 | (CN) | 2015 2 1028814 U |
| Dec. 10, 2015 | (CN) | 2015 2 1028913 U |
| Dec. 10, 2015 | (CN) | 2015 2 1029002 U |
| Dec. 10, 2015 | (CN) | 2015 2 1029087 U |
| Dec. 10, 2015 | (CN) | 2015 2 1029798 U |
| Dec. 10, 2015 | (CN) | 2015 2 1030034 U |
| Mar. 1, 2016 | (CN) | 2016 1 0114861 |
| Mar. 1, 2016 | (CN) | 2016 2 0155481 U |

(51) Int. Cl.
| *A47L 9/10* | (2006.01) |
|---|---|
| *A47L 9/14* | (2006.01) |
| *A47L 9/16* | (2006.01) |
| *A47L 9/28* | (2006.01) |
| *F16H 7/08* | (2006.01) |
| *A47L 5/22* | (2006.01) |
| *A47L 9/00* | (2006.01) |
| *A47L 5/28* | (2006.01) |
| *A47L 9/24* | (2006.01) |
| *F16D 23/12* | (2006.01) |

(52) U.S. Cl.
CPC .............. *A47L 9/00* (2013.01); *A47L 9/04* (2013.01); *A47L 9/0444* (2013.01); *A47L 9/0477* (2013.01); *A47L 9/102* (2013.01); *A47L 9/1409* (2013.01); *A47L 9/16* (2013.01); *A47L 9/1683* (2013.01); *A47L 9/248* (2013.01); *A47L 9/28* (2013.01); *A47L 9/2852* (2013.01); *A47L 9/2857* (2013.01); *F16H 7/0827* (2013.01); *F16D 2023/126* (2013.01)

(58) Field of Classification Search
CPC ...... A47L 9/0444; A47L 9/0477; A47L 9/102; A47L 9/1409; A47L 9/16; A47L 9/1683; A47L 9/248; A47L 9/28; A47L 9/2852; A47L 9/2857; F16D 2023/126; F16H 7/0827
See application file for complete search history.

(56) References Cited

U.S. PATENT DOCUMENTS

| 2,343,732 | A | * | 3/1944 | Baird | A47L 5/30 15/319 |
|---|---|---|---|---|---|
| 2,627,623 | A | * | 2/1953 | Humphrey | A47L 5/32 15/372 |
| 2,637,874 | A | * | 5/1953 | White | A47L 5/32 15/332 |
| 4,139,922 | A | | 2/1979 | Fitch | |
| 4,249,281 | A | * | 2/1981 | Meyer | A47L 5/30 15/340.2 |
| 4,419,784 | A | * | 12/1983 | Lex | A47L 5/26 15/344 |
| 4,976,003 | A | | 12/1990 | Williams | |
| 5,537,712 | A | * | 7/1996 | Weber | A47L 5/26 15/332 |
| 5,901,411 | A | * | 5/1999 | Hato | A47L 9/0411 15/377 |
| 6,067,689 | A | * | 5/2000 | Roney | A47L 5/30 15/332 |
| 6,098,243 | A | * | 8/2000 | Kim | A47L 5/30 15/332 |
| 2004/0074044 | A1 | * | 4/2004 | Diehl | A47L 5/22 15/412 |
| 2006/0277713 | A1 | * | 12/2006 | Sandlin | A47L 9/04 15/387 |
| 2006/0288521 | A1 | * | 12/2006 | Ogawa | A47L 5/30 15/390 |
| 2008/0078041 | A1 | * | 4/2008 | Mitchel | A47L 11/305 15/50.3 |
| 2011/0179596 | A1 | * | 7/2011 | Krebs | A47L 5/30 15/389 |
| 2012/0005857 | A1 | * | 1/2012 | Tran | A47L 9/045 15/390 |
| 2017/0296015 | A1 | * | 10/2017 | Hu | A47L 5/30 |

FOREIGN PATENT DOCUMENTS

| CN | 101201123 A | 6/2008 |
|---|---|---|
| CN | 202235160 U | 5/2012 |
| CN | 102871604 A | 1/2013 |
| CN | 204520516 U | 8/2015 |
| CN | 105065591 A * | 11/2015 |
| CN | 205251420 U | 5/2016 |
| CN | 205338839 U | 6/2016 |

OTHER PUBLICATIONS

CN First Office Action dated Jun. 1, 2017 in the corresponding CN application(application No. 201510917528.X).
CN First Office Action dated Jun. 1, 2017 in the corresponding CN application(application No. 201510918580.7).
CN First Office Action dated May 26, 2017 in the corresponding CN application (application No. 201510917499.7).

* cited by examiner

UPRIGHT VACUUM CLEANER

CROSS REFERENCE TO RELATED APPLICATION

The present application is a National Stage of International Application No. PCT/CN2016/075603, filed Mar. 4, 2016, which claims the priority and benefit of Chinese Patent Application No. 201510917499.7, 201521029002.X, 201510917466.2, 201521028726.2, 201510917497.8, 201521028730.9, 201521029087.1, 201510918662.1, 201521028812.3, 201510918544.0, 201521028739.X, 201510918580.7, 201521027156.5, 201510917498.2, 201521027158.4, 201521028814.2, 201521028779.4, 201521029798.9, 201510918541.7, 201521027550.9, 201510917653.0, 201521028784.5, 201510917528.X, 201521028913.0, and 201521030034.1, all filed on Dec. 10, 2015, and 201610114861.1 and 201620155481.8, both filed on Mar. 1, 2016, the contents of which are incorporated herein by reference in their entirety.

FIELD

The present disclosure relates to a technical field of cleaning apparatus, and particularly to an upright vacuum cleaner.

BACKGROUND

At present, a motor is usually used to drive a brushroll to roll via a drive belt in an upright vacuum cleaner, so as to clean a surface to be cleaned. When the drive belt is mounted, the drive belt needs to be in a loosened state. In a using process, however, the drive belt needs to be tensioned to realize transmission. In the upright vacuum cleaner in the related art, an independent tensioning device is adopted to tension the drive belt, but results in a complicated structure and inconvenient operations.

SUMMARY

The present disclosure aims to solve at least one of the problems existing in the related art. Thus, the present disclosure provides an upright vacuum cleaner, which can realize tensioning of a drive belt conveniently and has advantages of a simple structure and a convenient operation.

The upright vacuum cleaner according to embodiments of the present disclosure includes: a brushroll assembly including a brushroll casing and a brushroll disposed in the brushroll casing; a motor assembly including a motor housing and a motor disposed in the motor housing, in which the motor drives the brushroll to roll via a drive belt; a body assembly including a body and a bridging member mounted to the body, in which the bridging member is pivotably connected with the motor housing to allow the body to be rotatable between an upright position and an oblique position. When the body is rotated from the upright position to the oblique position, the bridging member pushes the brushroll casing to move in a direction running away from the motor housing so as to tension the drive belt.

In the upright vacuum cleaner according to embodiments of the present disclosure, by rotating the body to the oblique position for use, the bridging member may push the brushroll casing to move in the direction running away from the motor housing conveniently, so as to tension the drive belt easily. In addition, the upright vacuum cleaner has advantages of a simple structure and a convenient operation.

According to an example of the present disclosure, the upright vacuum cleaner further includes a gear and rack assembly disposed between the bridging member and the brushroll casing, so that the bridging member drives the brushroll casing to move via the gear and rack assembly.

According to an example of the present disclosure, the gear and rack assembly includes a gear and a rack, the rack is mounted to the brushroll casing horizontally and extends along a front-and-rear direction, and the gear is mounted to the bridging member vertically and meshed with the rack.

According to an example of the present disclosure, the gear includes: an arc rim whose central axis is a rotating axis of the bridging member; and two groups of meshing teeth connected to two ends of the rim respectively, in which each group of meshing teeth includes a plurality of single meshing teeth.

According to an example of the present disclosure, the bridging member includes a top plate and two side plates connected to two sides of the top plate, and the gear and the side plate are molded integrally.

According to an example of the present disclosure, two racks are provided and disposed at two sides of a longitudinal central axis of the brushroll casing symmetrically, and two gears are provided and fitted with the two racks correspondingly.

According to an example of the present disclosure, the two racks are both mounted to the brushroll casing via a connecting rod.

According to an example of the present disclosure, two connecting rods are provided and respectively connected with the two racks correspondingly, and the two connecting rods are respectively mounted to the brushroll casing independently.

According to an example of the present disclosure, one connecting rod is provided and extends along a left-and-right direction, two ends of the connecting rod are connected with front ends of the two racks respectively, and the connecting rod is mounted to the brushroll casing.

According to an example of the present disclosure, the upright vacuum cleaner further includes an elastic member having two ends connected with the brushroll casing and the motor housing respectively so as to hinder the brushroll casing from moving in the direction running away from the motor housing.

According to an example of the present disclosure, two elastic members are provided and disposed at two sides of a longitudinal central axis of the brushroll casing symmetrically.

According to an example of the present disclosure, the elastic member is a spring.

According to an example of the present disclosure, a rotating axis of the motor and a rotating axis of the brushroll are arranged in a non-parallel manner, and the drive belt is winded upon a motor shaft of the motor and the brushroll.

According to an example of the present disclosure, the motor shaft is arranged vertically, the rotating axis of the brushroll is perpendicular to the motor shaft, and the drive belt is twisted by an angle of 90°.

According to an example of the present disclosure, the brushroll includes a first brushroll section provided with bristles, a second brushroll section provided with bristles, and a connecting shaft section connected between the first brushroll section and the second brushroll section, in which the drive belt is winded upon the motor shaft and the connecting shaft section so that the motor drives the brushroll to roll.

According to an example of the present disclosure, respective central axes of the first brushroll section, the second brushroll section and the connecting shaft section are located in a same line, and the first brushroll section and the second brushroll section are arranged symmetrically with respect to the drive belt.

According to an example of the present disclosure, the brushroll casing defines a mounting chamber configured to accommodate the connecting shaft section and the drive belt, a first air-suction channel and a second air-suction channel located at two sides of the mounting chamber respectively and separated from the mounting chamber.

According to an example of the present disclosure, the first air-suction channel and the second air-suction channel both include a lateral air-suction channel section and a longitudinal air-suction channel section, the lateral air-suction channel section extends along an axial direction of the brushroll, and the longitudinal air-suction channel section extends along a direction perpendicular to the axial direction of the brushroll and is communicated with the corresponding lateral air-suction channel section.

Additional aspects and advantages of the present disclosure will be given in part in the following descriptions, become apparent in part from the following descriptions, or be learned from the practice of the present disclosure.

REFERENCE NUMERALS

Figure 1:
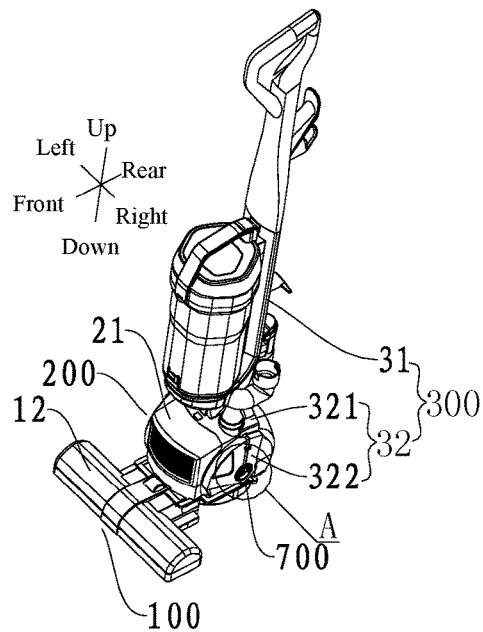
FIG. 1 is a perspective view of an upright vacuum cleaner according to an embodiment of the present disclosure, in which a body is in an upright position.

1: upright vacuum cleaner;
100: brushroll assembly; 11: brushroll; 111: first brushroll section; 1111: first body; 1112: first bristle; 112: second brushroll section; 1121: second body; 1122: second bristle; 113: connecting shaft section; 12: brushroll casing; 122: brushroll air-suction channel; 1221: first air-suction channel; 1222: second air-suction channel; 123: drive-belt mounting chamber; 124: upper casing; 125: lower casing; 13: drive belt; 14: tensioning wheel;
200: motor assembly; 21: motor housing; 211: dirty air outlet; 212: clean air inlet; 213: air exhaust hole; 214: dirty air output pipe; 215: clean air input pipe; 216: motor air-suction channel; 2161: first branch channel; 2162: second branch channel; 22: motor; 221: motor shaft; 222: motor casing;
300: body assembly; 31: body; 311: body air-exhaust channel; 32: bridging member; 321: top plate; 322: side plate; 37: dirt cup; 371: separating chamber; 372: air inlet; 373: air outlet; 38: wheel; 39: air exhaust pipe;
51: air inlet pipe; 52: hose;
700: gear and rack assembly; 71: gear; 711: rim; 712: meshing tooth; 713: single meshing tooth; 72: rack; 73: connecting rod;
800: elastic member.

DETAILED DESCRIPTION

Embodiments of the present disclosure will be described in detail below and examples of the embodiments will be illustrated in the drawings, where same or similar reference numerals are used to indicate same or similar members or members with same or similar functions. The embodiments described herein with reference to drawings are explanatory, which are used to illustrate the present disclosure, but shall not be construed to limit the present disclosure.

The following description provides a plurality of different embodiments or examples to realize different structures of the present disclosure. To simplify the description of the present disclosure, components and configurations in specific examples are elaborated below. Certainly, they are only explanatory, and are not intended to limit the present disclosure. Moreover, reference numbers and/or letters may be repeated in different examples of the present disclosure for the purpose of simplicity and clarity, which shall not be constructed to indicate the relationships among various embodiments and/or configurations. In addition, the present disclosure provides examples of various specific processes and materials, but applicability of other processes and/or utilization of other materials are conceivable for those skilled in the art.

An upright vacuum cleaner 1 according to embodiments of the present disclosure will be described in detail with reference to FIGS. 1 to 29. An up-and-down direction refers to an up-and-down direction when the upright vacuum cleaner 1 is operates normally.

As illustrated in FIG. 1 to FIG. 4, the upright vacuum cleaner 1 according to embodiments of the present disclosure includes: a brushroll assembly 100, a motor assembly 200 and a body assembly 300.

Specifically, the brushroll assembly 100 includes a brushroll casing 12 and a brushroll 11 provided in the brushroll casing 12. The brushroll casing 12 may protect the brushroll 11 and a drive mechanism, and also prevent dust and debris from rising up, so as to avoid secondary pollution. The motor assembly 200 includes a motor housing 21 and a motor (not illustrated in the drawings) provided in the motor housing 21. The motor drives the brushroll 11 to roll via a drive belt (not illustrated in the drawings) to realize sweeping. Meanwhile, the motor may be connected with a fan of the upright vacuum cleaner 1 to directly drive the fan to rotate, so as to realize synchronous operations of vacuuming and sweeping.

Figure 9:
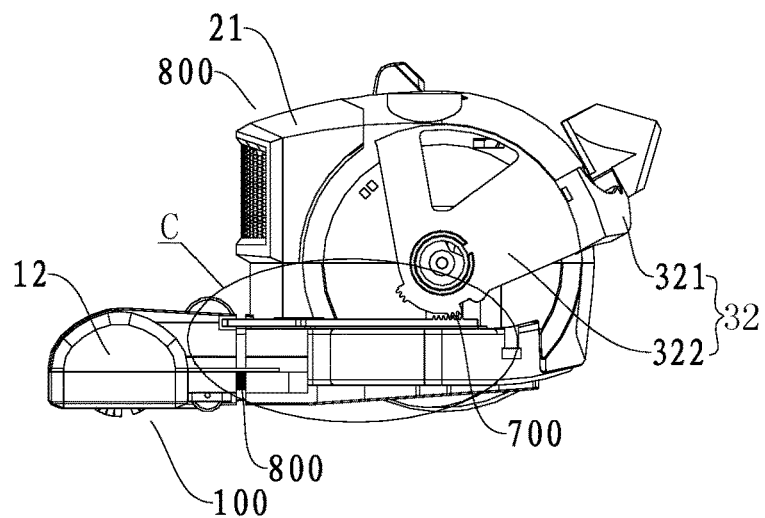
FIG. 9 is a side view of a part of an upright vacuum cleaner according to an embodiment of the present disclosure, in which a body is in an oblique position.
Figure 10:
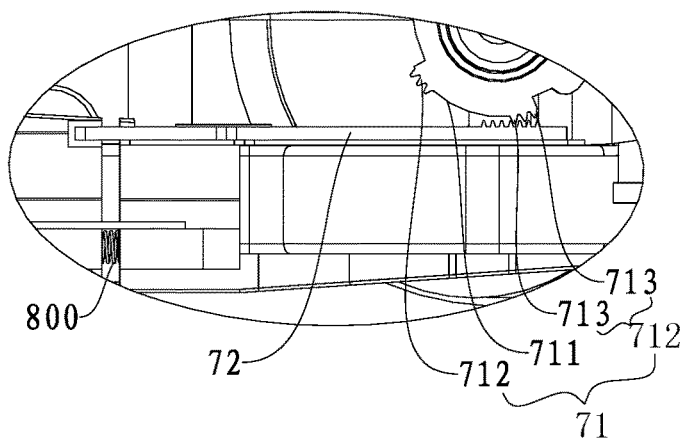
FIG. 10 is an enlarged view of part C circled in FIG. 9.
Figure 11:
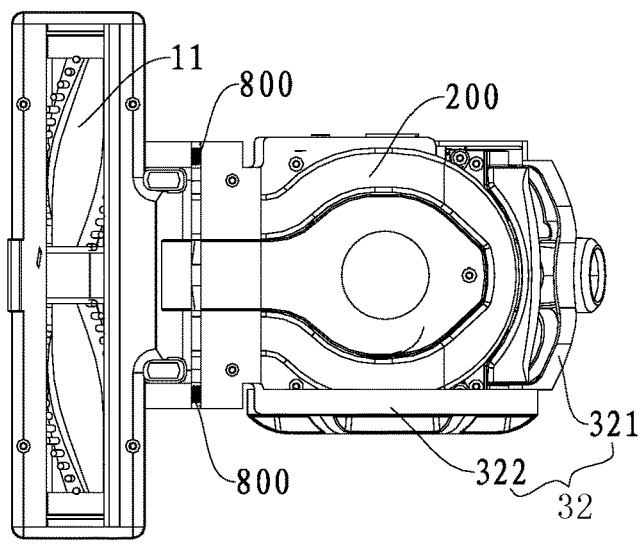
FIG. 11 is a top view of a part of an upright vacuum cleaner according to an embodiment of the present disclosure, in which a body is in an oblique position.

As illustrated in FIGS. 1 to 4, the body assembly 300 includes a body 31 and a bridging member 32 mounted to the body 31. The bridging member 32 is rotatably connected with the motor housing 21 to allow the body 31 to be rotatable between an upright position and an oblique position. When the upright vacuum cleaner 1 is unused, as illustrated in FIGS. 1 to 8, the body 31 may be rotated to the upright position to reduce an occupation area of the upright vacuum cleaner 1 and thus facilitate the placement of the upright vacuum cleaner 1. When the upright vacuum cleaner 1 cleans a surface to be cleaned, the user may rotate the body 31 and the bridging member 32, so that the body 31 may be rotated to the oblique position, as illustrated in FIGS. 9 to 11, and thus the user may push or pull the upright vacuum cleaner 1 conveniently to realize movable cleaning.

When the body 31 is rotated from the upright position to the oblique position, the bridging member 32 may push the brushroll casing 12 to move in a direction running away from the motor housing 21, so as to tension the drive belt. That is, when the upright vacuum cleaner 1 is needed for cleaning, the body 31 is rotated from the upright position to the oblique position, in which case the bridging member 32 pushes the brushroll casing 12 to move in the direction running away from the motor housing 21 (for example forwards as illustrated in FIG. 1), comparing FIG. 7 with FIG. 9. In such way, a distance between the brushroll casing 12 and the motor increases, so that a distance between the brushroll 11 and a motor shaft is larger than an axis distance of the drive belt, and thus the drive belt is tensioned from a loosened state to a tensioned state. Therefore, the drive belt may be used for transmission so as to drive the brushroll 11 to roll.

It may be understood that when the surface to be cleaned needs to be cleaned, the body 31 only needs to be rotated from the upright position to the oblique position to tension the drive belt via the bridging member 32, so as to finish tasks of dust suction and dust sweep, thus providing a simple structure and also a convenient operation.

In the upright vacuum cleaner 1 according to embodiments of the present disclosure, when the body 31 moves from the upright position to the oblique position, the brushroll casing 12 is pushed by the bridging member 32 to move in the direction running away from the motor housing 21, so that the drive belt is tensioned conveniently, and also, the upright vacuum cleaner 1 has advantages of a simple structure and a convenient operation.

Figure 3:
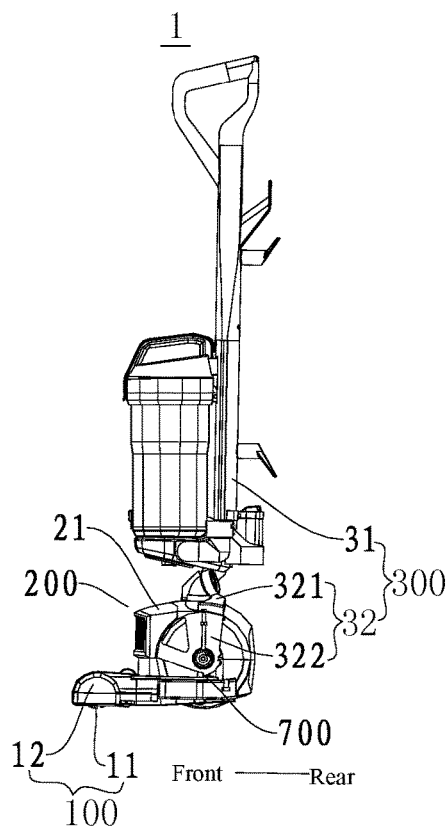
FIG. 3 is a side view of an upright vacuum cleaner according to an embodiment of the present disclosure, in which a body is in an upright position.
Figure 4:
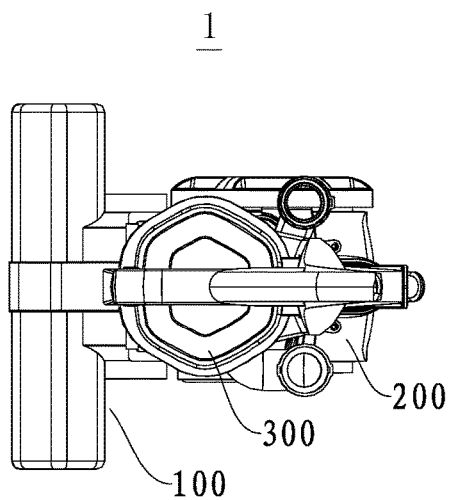
FIG. 4 is a top view of an upright vacuum cleaner according to an embodiment of the present disclosure, in which a body is in an upright position.
Figure 5:
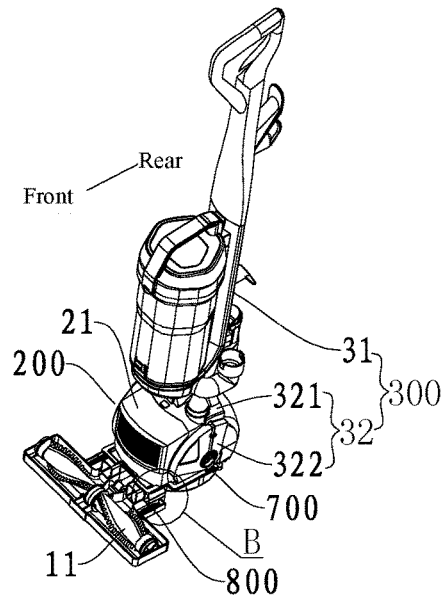
FIG. 5 is a perspective view of a part of an upright vacuum cleaner according to an embodiment of the present disclosure, in which a body is in an upright position.

According to some embodiments of the present disclosure, the upright vacuum cleaner 1 may further include a gear and rack assembly 700. As illustrated in FIG. 1, FIG. 3 and FIG. 5, the gear and rack assembly 700 may be disposed between the bridging member 32 and the brushroll casing 12 so that the bridging member 32 drives the brushroll casing 12 to move via the gear and rack assembly 700. By providing the gear and rack assembly 700, the reliability and stability of tensioning the drive belt by the bridging member 32 is improved, and also a probability of damaging the upright vacuum cleaner 1 is reduced, thus prolonging the service life of the upright vacuum cleaner 1.

Figure 2:
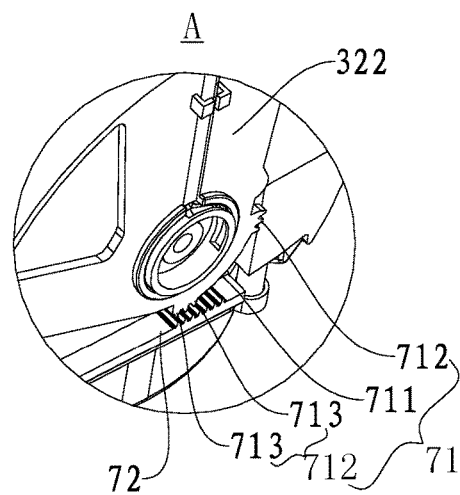
FIG. 2 is an enlarged view of part A circled in FIG. 1.

As an optional embodiment, as illustrated in FIG. 2 and FIG. 10, the gear and rack assembly 700 may include a gear 71 and a rack 72. The rack 72 is mounted on the brushroll casing 12 horizontally and extends along a front-and-rear direction. The gear 71 is mounted to the bridging member 32 vertically and meshed with the rack 72. Thus, the bridging member 32 can drive the gear 71 to rotate when rotating, and also, the gear 71 and the rack 72 are in meshing transmission, so that the rack 72 is moved in the front-and-rear direction. When the rack 72 moves forwards, the rack 72 may drive the brushroll casing 12 to move forwards, so that the distance between the brushroll 11 and the motor is increased to tension the drive belt.

Optionally, as illustrated in FIG. 2 and FIG. 10, the gear 71 may include an arc rim 711 whose central axis is a pivoting axis of the bridging member 32, and two groups of meshing teeth 712 connected to two ends of the rim 711 respectively. Each group of meshing teeth 712 includes a plurality of single meshing teeth 713. In other words, the gear 71 includes the rim 711 and the two groups of meshing teeth 712. The rim 711 has an arc shape and the central axis of the rim 711 is the pivoting axis of the bridging member 32. The two groups of meshing teeth 712 are connected to the two ends of the rim 711 respectively, and each group of meshing teeth 712 includes the plurality of single meshing teeth 713. In such a way, the two groups of meshing teeth 712 may be meshed with the rack 72 respectively. For example, when the body 31 is in the upright position, as illustrated in FIG. 1 to FIG. 8, a first group of meshing teeth 712 are meshed with the rack 72. When the body 31 is rotated from the upright position to the oblique position, the bridging member 32 drives the gear 71 to rotate, and the first group of meshing teeth 712 are in meshing transmission with the rack 72, so that the rack 72 move towards the brushroll casing 12 and drives the brushroll casing 12 to move away from the motor, thus tensioning the drive belt.

When the body 31 is rotated by a certain angle, the first group of meshing teeth 712 escape from meshing with the rack 72, and also, a second group of meshing teeth 712 may be meshed with the rack 72 so as to keep the drive belt tensioned. Thus, the simple structure is provided, and also the high reliability and stability may be achieved.

In some embodiments of the present disclosure, as illustrated in FIG. 1, FIG. 3, FIG. 5, FIG. 7 and FIG. 9, the bridging member 32 may include a top plate 321 and two side plates 322 connected at both sides of the top plate 321, and each side plate 322 is pivotably connected with a side wall of the motor housing 21. The gear 71 and the side plate 322 may be molded integrally so as to facilitate processing and manufacture of the gear 71, improve the assembling efficiency and reduce the production cost.

Figure 12:
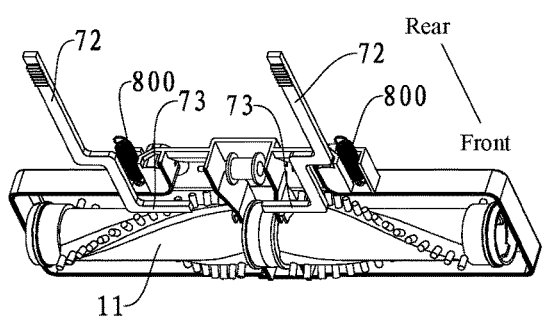
FIG. 12 is a perspective view of a part of an upright vacuum cleaner according to an embodiment of the present disclosure.
Figure 13:
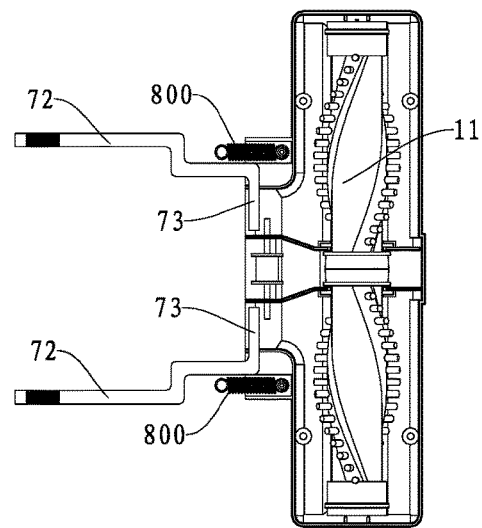
FIG. 13 is a top view of a part of an upright vacuum cleaner according to an embodiment of the present disclosure.
Figure 14:
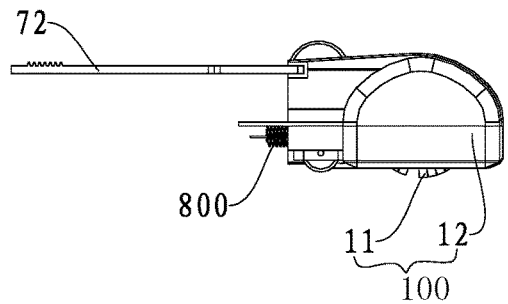
FIG. 14 is a side view of a part of an upright vacuum cleaner according to an embodiment of the present disclosure.

Optionally, as illustrated in FIG. 12 and FIG. 13, two racks 72 are provided and disposed at two sides of a longitudinal central axis (for example a central axis in a left-and-right direction as illustrated in FIG. 1) of the brushroll casing 12 symmetrically, and two gears 71 may be also provided and fitted with the two racks 72 correspondingly. That is, the two gears 71 may rotate relative to the motor housing 21, and the two racks 72 are disposed at two sides of the brushroll casing 12 symmetrically and fitted with the two gears 71 respectively. Thus, during rotation of the body 31 from the upright position to the oblique position, the two racks 72 may be pushed to move in the direction running away from the motor housing 21 through respective fit between the two gears 71 and the two racks 72. The two racks 72 may push the brushroll casing 12 at two ends of the brushroll casing 12 so as to increase the distance between the brushroll 11 and the motor, thus tensioning the drive belt. As the two ends of the brushroll casing 12 are subject to even forces, the stability and reliability are further improved.

In some embodiments of the present disclosure, both the two racks 72 are mounted to the brushroll casing 12 via a connecting rod 73, thus facilitating the installation of the rack 72. For example, in a specific example of the preset disclosure, as illustrated in FIG. 12 and FIG. 13, two connecting rods 73 may be provided and connected with the two racks 72 correspondingly. The two connecting rods 73 are respectively mounted to the brushroll casing 12 independently. That is, the two connecting rods 73 are mounted to the brushroll casing 12 respectively, without contact and connection therebetween. The two connecting rods 73 are connected with the two racks 72 respectively so that the two racks 72 may be mounted to the brushroll casing 12 respectively in a simple and convenient manner by means of the two connecting rods 73.

For example, in another specific example of the present disclosure, one connecting rod 73 is provided and extends along the left-and-right direction. Two ends of the connecting rod 73 are connected with front ends of the two racks 72 respectively, and the connecting rod 73 is mounted to the brushroll casing 12. That is, the connecting rod 73 is a straight rod and has two ends connected with the two racks 43 respectively. Or, in other words, the front ends of the two racks 72 may be connected via the connecting rod 73 extending along the left-and-right direction. Thus, a movement synchronism of the two racks 72 may be improved, and the two ends of the brushroll casing 12 are subject to more even forces, thus protecting the brushroll casing 12 to a certain extent.

Figure 6:
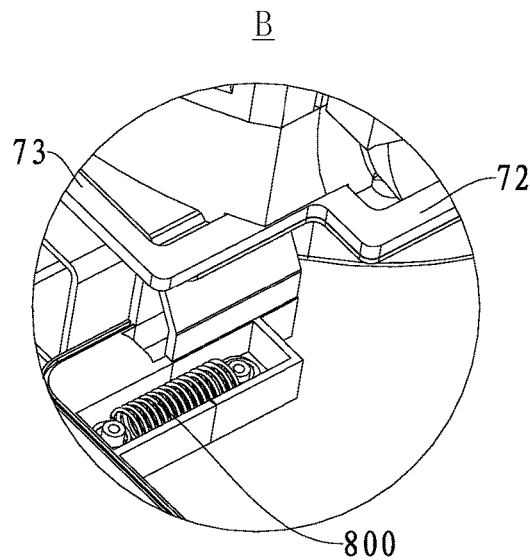
FIG. 6 is an enlarged view of part B circled in FIG. 5.
Figure 7:
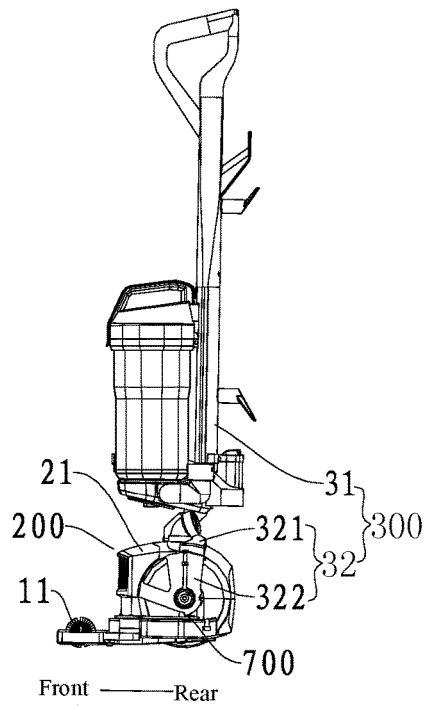
FIG. 7 is a side view of a part of an upright vacuum cleaner according to an embodiment of the present disclosure, in which a body is in an upright position.

According to some embodiments of the present disclosure, as illustrated in FIG. 5 to FIG. 11, the upright vacuum cleaner 1 may further include an elastic member 800. As illustrated in FIG. 6, two ends of the elastic member 800 are connected with the brushroll casing 12 and the motor housing 21 respectively so as to hinder the brushroll casing 12 from moving in the direction running away from the motor housing 21. That is, two ends of the elastic member 800 are connected with the brushroll casing 12 and the motor housing 21 respectively, and the elastic member 800 hinders the brushroll casing 12 from moving away from the motor housing 21 constantly.

Thus, when the body 31 is rotated to the oblique position, the rack 72 pushes the brushroll casing 12 to move in the direction running away from the motor housing 21 (for example forwards illustrated in FIG. 1) so as to tension the drive belt, and the motor drives the brushroll 11 to roll via the drive belt, thus realizing the dust suction and cleaning. When the body 31 is rotated towards the upright position and the gear 71 escapes from meshing with the rack 72, under the action of the elastic member 800, the brushroll casing 12 moves towards the motor housing 21 (for example backwards illustrated in FIG. 1) so that the distance between the brushroll 11 and the motor shaft is larger than the axis distance of the drive belt. Thus, the drive belt is in the loosened state and stops driving, the brushroll 11 hence stops rolling and further the dust suction and cleaning are stopped. In this way, the brushroll 11 may be controlled to roll or stop rolling by controlling the rotation of the body 31 between the upright position and the oblique position, which is convenient, rapid, timely and reliable.

In addition, the rolling of the brushroll 11 may be driven by the motor directly without adding a specialized driving motor, which not only saves energy and cuts down the cost, but also saves space and improves the aesthetic property.

Figure 8:
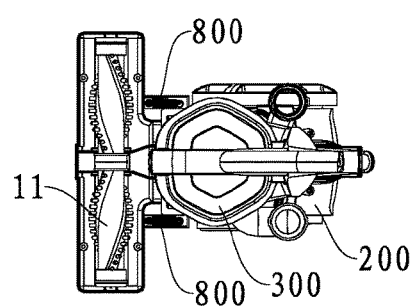
FIG. 8 is a top view of a part of an upright vacuum cleaner according to an embodiment of the present disclosure, in which a body is in an upright position.

Optionally, as illustrated in FIG. 8 and FIG. 11, two elastic members 800 are provided and disposed at two sides of the longitudinal central axis of the brushroll casing 12 symmetrically. On one hand, the force applied to the brushroll casing 12 is relatively even so as to improve the stability and reliability, and on the other hand, the upright vacuum cleaner 1 has a simple and compact structure as well as an aesthetic and tidy appearance.

Optionally, the elastic member 800 may be a spring. As illustrated in FIG. 5 to FIG. 11, two ends of the spring are connected with the brushroll casing 12 and the motor housing 21 respectively and the spring may hinder the brushroll casing 12 from moving in the direction running away from the motor housing 21 constantly. Specifically, the spring may be an extension spring. When the body 31 is rotated from the oblique position to the upright position and the second group of meshing teeth 712 escape from meshing with the rack 72, the extension spring drives the brushroll casing 12 to move towards the motor housing 21, and hence the first group of meshing teeth 712 are fitted with the rack 72. Thus, the drive belt may be loosened automatically to stop the brushroll 11 rolling. Therefore, the number of the groups of meshing teeth 712 and the amount of the single meshing teeth 713 are reduced, hence reducing the production cost and the processing difficulty significantly and improving the rotation flexibility of the bridging member 32.

In summary, in the upright vacuum cleaner 1 according to embodiments of the present disclosure, when the body 31 is rotated from the upright position to the oblique position, the brushroll casing 12 is pushed by the bridging member 32 to move in the direction running away from the motor housing 21, so that the drive belt may be tensioned conveniently, and also, the upright vacuum cleaner 1 has advantages of a simple structure and a convenient operation. Furthermore, with the elastic member 800 hindering the brushroll casing 12 from moving in the direction running away from the motor housing 21, the drive belt may be loosened automatically to stop the brushroll 11 rolling, which is timely and reliable, and also saves energy and reduces the cost.

Figure 15:
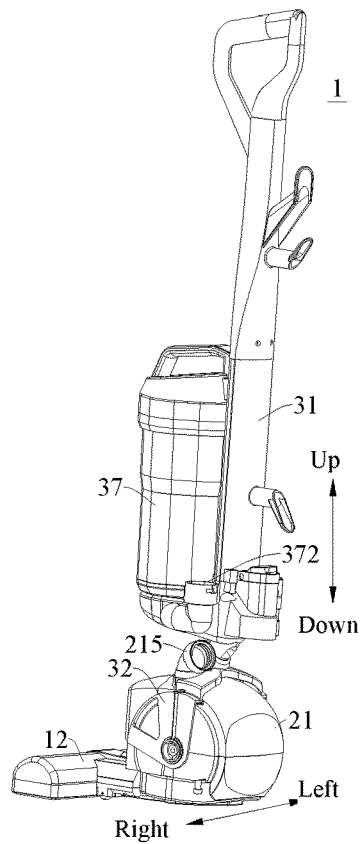
FIG. 15 is a schematic view of an upright vacuum cleaner according to an embodiment of the present disclosure.
Figure 16:
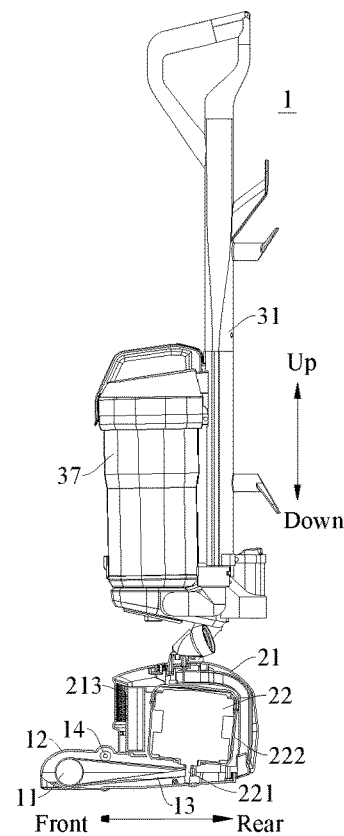
FIG. 16 is a side view of the upright vacuum cleaner illustrated in FIG. 15, in which a motor at a first oblique position.
Figure 17:
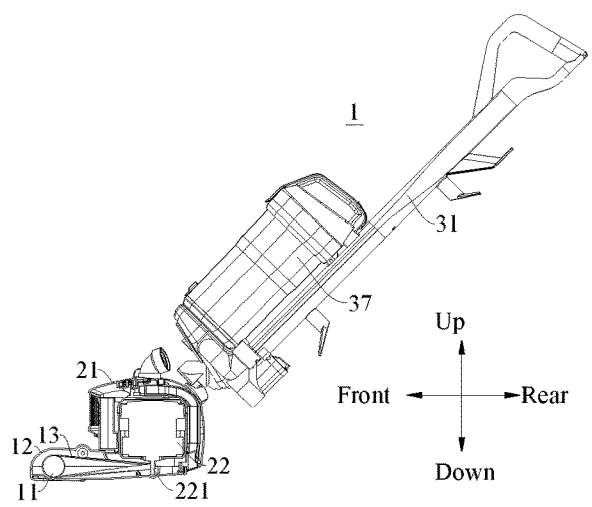
FIG. 17 is a side view of the upright vacuum cleaner illustrated in FIG. 15, in which the motor at a first upright position.
Figure 18:
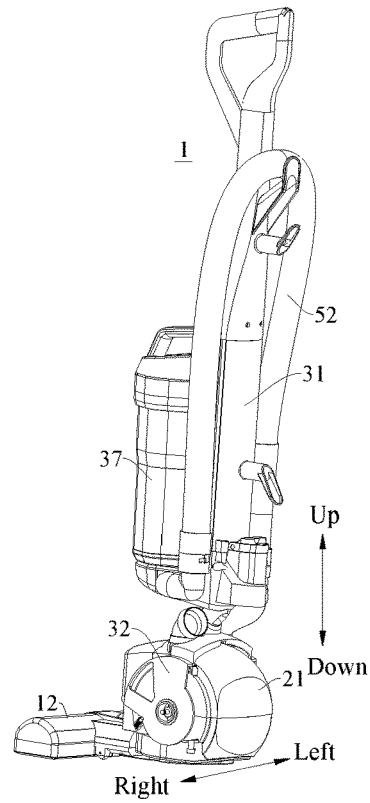
FIG. 18 is a schematic view of the upright vacuum cleaner illustrated in FIG. 15 in a direction.
Figure 19:
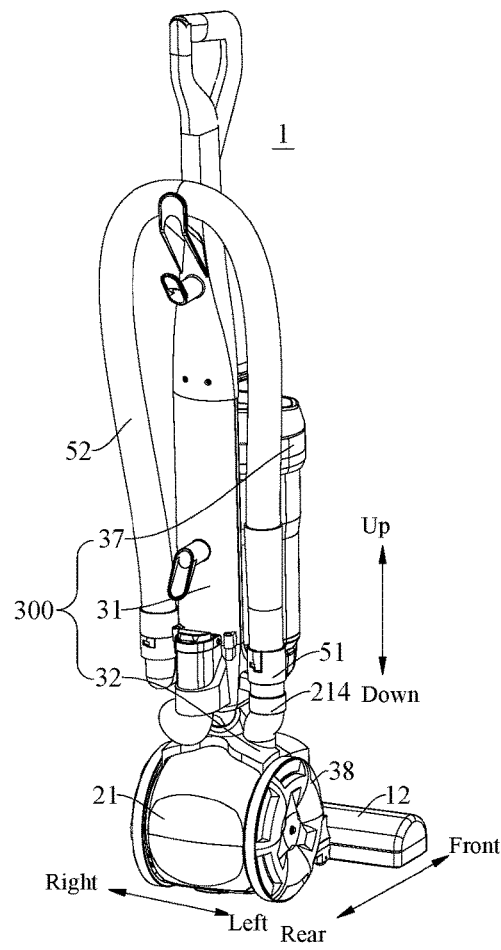
FIG. 19 is a schematic view of an upright vacuum cleaner according to another embodiment of the present disclosure.
Figure 20:
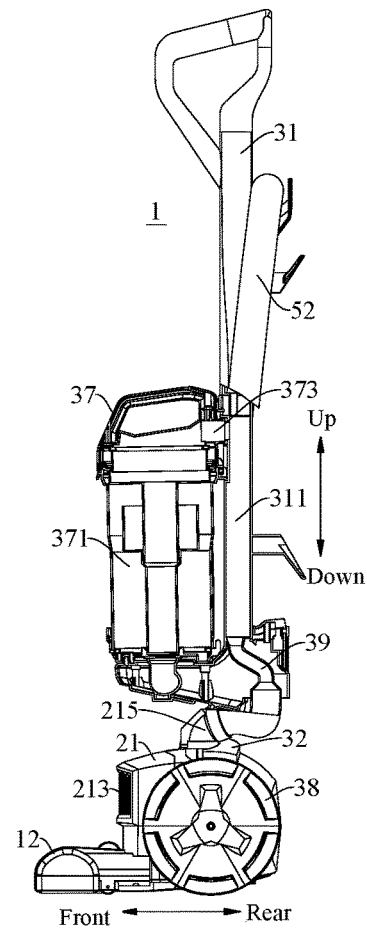
FIG. 20 is a side view of the upright vacuum cleaner illustrated in FIG. 19.

A rotating axis of the motor 22 and a rotating axis of the brushroll 11 are arranged in a non-parallel manner, and the motor 22 drives the brushroll 11 to roll via the drive belt 13. Specifically, as illustrated in FIGS. 15 and 16, the rotating axis of the brushroll 11 extends along a horizontal direction (i.e. the left-and-right direction as illustrated in FIG. 15), and the rotating axis of the motor 22 and the rotating axis of the brushroll 11 are arranged in the non-parallel manner. For example, the rotating axis of the motor 22 may extend along a vertical direction (i.e. an up-and-down direction as illustrated in FIG. 16) or be arranged obliquely with respect to the vertical direction. The drive belt 13 is provided between the motor 22 and the brushroll 11. The drive belt 13 is winded upon a motor shaft 221 of the motor 22 and the brushroll 11 to drive the brushroll 11.

Alternatively, the motor 22 may be disposed near the floor. That is, the gravity center of the motor 22 is lower than that of the motor 22 of the vacuum cleaner in the related art, such that, for the vacuum cleaners having the body 31 of the same length, the user may manipulate the upright vacuum cleaner 1 in the present disclosure conveniently with less effort. A switch on the body 31 of the upright vacuum cleaner 1 may be controlled by hands to start or stop the upright vacuum cleaner 1. When the upright vacuum cleaner 1 is started, the motor 22 drives the fan and the brushroll 11 to rotate simultaneously so as to provide the vacuuming power. That is, above process may be completed by one action of the user, thus providing simple and convenient manipulations.

Thus, the rotating axis of the motor 22 and the rotating axis of the brushroll 11 are arranged in the non-parallel manner, so as to reduce a volume of the motor 22 and hence an occupation space of the upright vacuum cleaner 1, thus facilitating diverse arrangements of various parts of the upright vacuum cleaner 1. Further, the upright vacuum cleaner 1 controls the rotation of the brushroll 11 and the fan simultaneously by one motor 22, which occupies a small space with few parts but realizes synchronous control over the dust sweep and the dust suction. Additionally, the motor of the upright vacuum cleaner 1 is disposed vertically to further reduce the occupation space of the upright vacuum cleaner 1 and facilitate diverse arrangements of various parts of the upright vacuum cleaner 1. The upright vacuum cleaner 1 is simple and compact in structure, convenient to manipulate, and occupies a small space.

In an example of the present disclosure, the rotating axis of the motor 22 is arranged perpendicular to the rotating axis of the brushroll 11, that is, the rotating axis of the brushroll 11 is arranged perpendicular to the motor shaft 221, and the drive belt 13 is arranged with a twist angle of 90°. Referring to FIG. 15, the brushroll 11 is disposed in a horizontal plane and the rotating axis of the brushroll 11 extends along the horizontal direction. The motor 22 is disposed vertically in the motor housing 21 and the motor shaft 221 of the motor 22 is located in a vertical plane perpendicular to the rotating axis of the brushroll 11. That is, the rotating axis of the motor shaft 221 of the motor 22 and the rotating axis of the brushroll 11 are perpendicular to each other, so an upper half circle of the drive belt 13 and a lower half circle of the drive belt 13 are both twisted between the brushroll 11 and the motor shaft 221 for one time, and a twist angle between two ends of each half circle of the drive belt 13 is 90°.

Alternatively, according to an embodiment of the present disclosure, the motor shaft 221 of the motor 22 is arranged vertically. Specifically, the motor 22 mainly includes a motor body and a motor casing 222. The motor body is disposed in the motor casing 222 and mainly includes a core and the motor shaft 221. The motor shaft 221 of the motor 22 is connected with the core of the motor 22, and the motor 22 is arranged vertically. When the upright vacuum cleaner 1 is in a non-working state, an upper end of the motor shaft 221 is inclined backwards relative to the vertical direction (i.e. the up-and-down direction illustrated in FIG. 17). During the dust suction process of the upright vacuum cleaner 1, a central axis of the motor shaft 221 extends along the vertical direction. That is, an end of the motor shaft 221 of the upright vacuum cleaner 1 may extend downwards relative to the core along the vertical direction (i.e. the up-and-down direction illustrated in FIG. 17). A first end of the drive belt 13 is fitted over the lower end of the motor shaft 221 and a second end of the drive belt 13 is fitted over the brushroll 11. Because the rotating axis of the brushroll 11 is arranged in the horizontal plane, the drive belt 13 is twisted for at least one time between the brushroll 11 and the motor shaft 221. That is, the twist angle of the drive belt 13 between a direction-changing contact point of the drive belt 13 and the motor shaft 221 and a direction-changing contact point of the drive belt 13 and the brushroll 11 is 90°.

When the body 31 is located at the upright position, the axis of the motor shaft 221 of the motor 22 is arranged obliquely backwards relative to the axis of the motor housing 21, in which case the two ends of the drive belt 13 are fitted over the motor shaft 221 and the brushroll 11 respectively, but the drive belt 13 is loosened. When the body 31 is located at the oblique position, the axis of the motor 22 extends along the vertical direction. That is, the motor 22 is located in an upright state, in which case the drive belt 13 is tensioned. Specifically, when the body 31 is rotated from the upright position to the oblique position by hands, the lower end of the motor shaft 221 moves backwards gradually, so as to increase the distance between the lower end of the motor shaft 221 and the brushroll 11, thus tensioning the drive belt 13.

The brushroll 11 includes a first brushroll section 111 provided with bristles, a second brushroll section 112 provided with bristles, and a connecting-shaft section 113 connected between the first brushroll section 111 and the second brushroll section 112. In other words, the brushroll 11 mainly includes the first brushroll section 111, the second brushroll section 112 and the connecting-shaft section 113. An end of the first brushroll section 111 and an end of the second brushroll section 112 are connected with two ends of the connecting-shaft section 113 respectively.

Referring to FIG. 15 and FIG. 16, the brushroll 11 is rotatably provided in the brushroll casing 12 and connected with the motor 22 to be driven to rotate around a rotating axis of the brushroll 11. The first brushroll section 111, the second brushroll section 112 and the connecting-shaft section 113 are configured to have a column shape extending along the horizontal direction (i.e. the left-and-right direction illustrated in FIG. 28). A right end of the first brushroll section 111 is connected with a left end of the connecting-shaft section 113, and a left end of the second brushroll section 112 is connected with a right end of the connecting-shaft section 113. Bristles may be provided to respective outer side walls of the first brushroll section 111 and the second brushroll section 112 to clean the floor, but no bristle is provided on the connecting-shaft section 113 to facilitate connection with the drive belt 13.

Further, the drive belt 13 is winded upon the motor shaft 221 of the motor 22 and the connecting-shaft section 113, such that the brushroll 11 may be driven to roll by the motor 22. Referring FIG. 16, the motor 22 is provided in the motor housing 21 of the vacuum cleaner and is connected with the fan and the brushroll 11 respectively. The motor 22 may drive the fan to rotate to generate an airflow so as to provide a vacuuming power for the upright vacuum cleaner 1, and the motor 22 may also drive the brushroll 11 to rotate around its own axis so as to realize the purpose of cleaning the floor.

Referring to FIG. 16, the brushroll 11 and the motor 22 are spaced apart from each other in a front-and-rear direction, and the brushroll 11 is located at a front side of the motor 22. The first end of the drive belt 13 is fitted over the motor shaft 221 of the motor 22, while the second end of the drive belt 13 is fitted over the connecting-shaft section 113 of the brushroll 11. When the motor shaft 221 of the motor 22 rotates, the motor shaft 221 drives the drive belt 13 to move due to a frictional resistance between the motor shaft 221 and a surface of the drive belt 13. Similarly, the drive belt 13 drives the brushroll 11 to rotate around its own axis due to a frictional resistance between the connecting-shaft section 113 of the brushroll 11 and the surface of the drive belt 13. Thus, the motor 22 may drive the brushroll 11 to rotate.

Preferably, according to an embodiment of the present disclosure, the first brushroll section 11 and the second brushroll section 11 are arranged symmetrically with respect to the drive belt 13. That is, the first brushroll section 111 has a same length in the axial direction as the second brushroll section 112. The first brushroll section 111 and the second brushroll section 112 are arranged symmetrically with respect to a central part of the connecting-shaft section 113. The first end of the drive belt 13 is winded upon the motor shaft 221 of the motor 22, and the second end of the drive belt 13 is winded upon the connecting-shaft section 113. That is, the drive belt 13 divides the brushroll 11 into the first brushroll section 111 and the second brushroll section 112 symmetric with each other in the left-and-right direction. Consequently, the first brushroll section 111 and the second brushroll section 112 may be subjected to balanced resistances to guarantee the stability of rotation of the brushroll 11, and also, same cleaning scopes are provided at two sides of the drive belt 13.

Further, respective central axes of the first brushroll section 111, the second brushroll section 112 and the connecting-shaft section 113 are located in a same line. That is, the first brushroll section 111, the second brushroll section 112 and the connecting-shaft section 113 are arranged coaxially. The motor 22 drives the first brushroll section 111, the second brushroll section 112 and the connecting-shaft section 113 to rotate simultaneously via the drive belt 13, such that the motor 22 of the upright vacuum cleaner 1 may drive the fan as well as the first brushroll section 111, the second brushroll section 112 and the connecting-shaft section 113 to rotate simultaneously, so as to implement an operation mode in which the dust sweep and the dust suction are performed at both sides of the drive belt 13. Compared with the vacuum cleaner in the related art that controls the fan and the brushroll 11 to rotate respectively by two motors 22, the upright vacuum cleaner 1 in the present disclosure has the simple structure and few parts, so the upright vacuum cleaner 1 occupies the small space and is easy to assemble or disassemble, which improves the assembling efficiency. Furthermore, the upright vacuum cleaner 1 in the present disclosure may realize synchronous control over the dust sweep and the dust suction.

Figure 21:
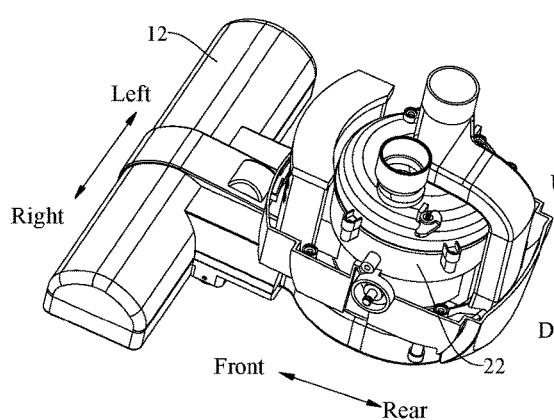
FIG. 21 is an assembling view of a brushroll assembly and a motor assembly of an upright vacuum cleaner according to an embodiment of the present disclosure.
Figure 22:
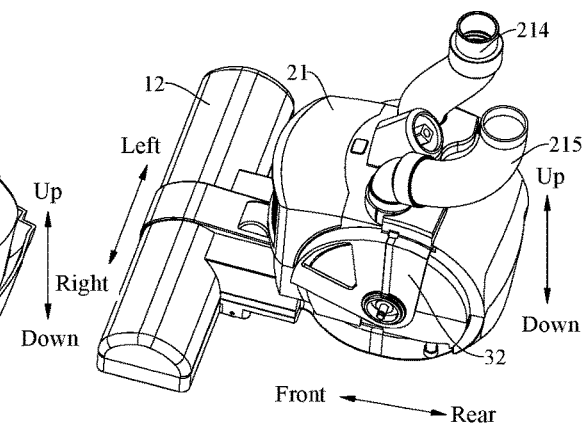
FIG. 22 is an assembling view of a brushroll assembly and a motor assembly of an upright vacuum cleaner according to another embodiment of the present disclosure.
Figure 23:
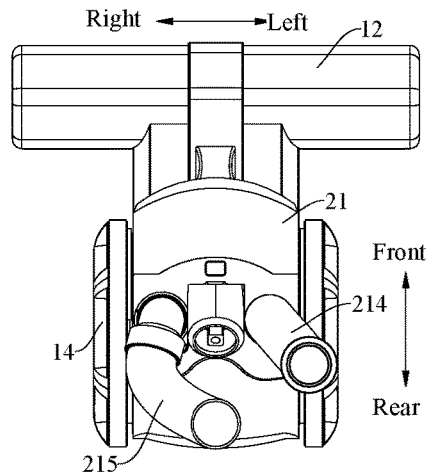
FIG. 23 is a top view of a structure illustrated in FIG. 22.

The brushroll casing 12 defines a drive-belt mounting chamber 123, a first air-suction channel 1221 and a second air-suction channel 1222. The drive-belt mounting chamber 123 is configured to accommodate the connecting-shaft section 113 and the drive belt 13. The first air-suction channel 1221 and the second air-suction channel 1222 are located at both sides of the drive-belt mounting chamber and separated from the drive-belt mounting chamber. Referring to FIG. 21 to FIG. 23, the brushroll casing 12 is configured to have a T shape, and has the first air-suction channel 1221, the second air-suction channel 1222 and the drive-belt mounting chamber 123 spaced apart from one another along the left-and-right direction. The first brushroll section 111 is rotatably provided in the first air-suction channel 1221, the second brushroll section 112 is rotatably provided in the second air-suction channel 1222, and the drive belt 13 is movably provided in the drive-belt mounting chamber 123.

Optionally, the first air-suction channel 1221 and the second air-suction channel 1222 may be disposed at left and right sides of the drive-belt mounting chamber 123 respectively and spaced apart from each other, such that dirty air and the dust sucked through the dust-suction port of the brushroll casing 12 are transmitted into the first air-suction channel 1221 and the second air-suction channel 1222 respectively, and then converged together to flow into a dirt cup 37. Specifically, the first air-suction channel 1221 and the second air-suction channel 1222 may be defined by parts provided in the brushroll casing 12 or by inner walls of the brushroll casing 12. Of course, the present disclosure is not limited to this. For example, the first air-suction channel 1221 and the second air-suction channel 1222 may be communicated with each other. That is, an interior of the brushroll casing 12 except a space occupied by the drive-belt mounting chamber 123 belongs to the first air-suction channel 1221 and the second air-suction channel 1222, and the dirty air and the dust sucked through the dust-suction port of the brushroll casing 12 are transmitted into the dirt cup 37 via the drive-belt mounting chamber 123.

Figure 25:
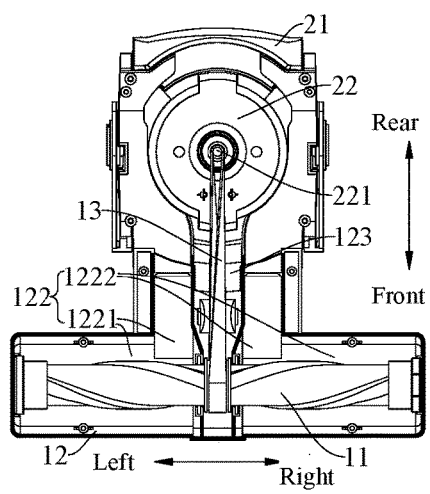
FIG. 25 is a bottom view of the structure illustrated in FIG. 21.
Figure 26:
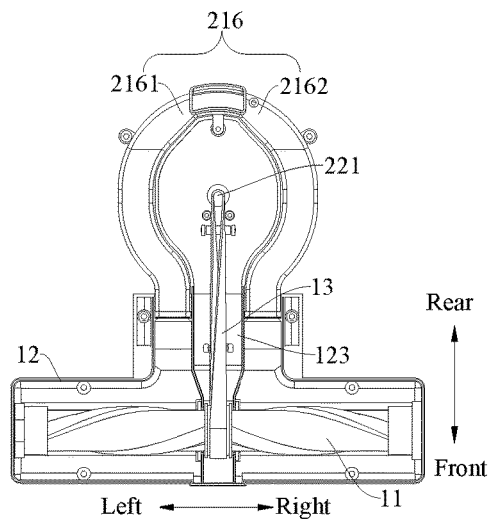
FIG. 26 is a schematic view of an internal channel of the structure illustrated in FIG. 25.
Figure 27:
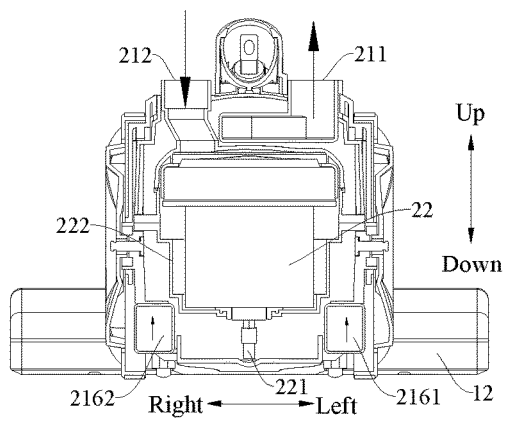
FIG. 27 is a rear view of an internal channel of the structure illustrated in FIG. 22.

As illustrated in FIG. 25, the first air-suction channel 1221 and the second air-suction channel 1222 both include a lateral air-suction channel section and a longitudinal air-suction channel section. The lateral air-suction channel section extends along the axial direction of the brushroll 11, and the longitudinal air-suction channel section extends along a direction perpendicular to the axial direction of the brushroll 11 and is communicated with the corresponding lateral air-suction channel section.

Specifically, the first air-suction channel 1221 mainly includes the lateral air-suction channel section located at a left side of the connecting-shaft section 113 and the longitudinal air-suction channel section located at a left side of the drive belt 13. The second air-suction channel 1222 mainly includes the lateral air-suction channel section located at a right side of the connecting-shaft section 113 and the longitudinal air-suction channel section located at a right side of the drive belt 13. A central line of each lateral air-suction channel section is perpendicular to a central line of the longitudinal air-suction channel section at a corresponding position.

Optionally, the first air-suction channel 1221 and the second air-suction channel 1222 are respectively formed to have L shapes facing away from each other. The drive-belt mounting chamber 123 is located between the first air-suction channel 1221 and the second air-suction channel 1222. When the brushroll 11 is mounted in the brushroll casing 12, the first brushroll section 111 is rotatably disposed in the first air-suction channel 1221, and the second brushroll section 112 is rotatably disposed in the second air-suction channel 1222. The motor 22 drives the first brushroll section 111 and the second brushroll section 112 to rotate synchronously via the drive belt 13.

Further, the motor housing 21 has a first branch channel 2161 communicated with the first air-suction channel 1221 and a second branch channel 2162 communicated with the second air-suction channel 1222. Specifically, the motor housing 21 is configured to have a hollow column shape and defines the first branch channel 2161 and the second branch channel 2162 therein. The first branch channel 2161 and the second branch channel 2162 are spaced apart from each other. The motor 22 is located between the first branch channel 2161 and the second branch channel 2162. A first end of the first branch channel 2161 is communicated with the first air-suction channel 1221 and a first end of the second branch channel 2162 is communicated with the second air-suction channel 1222. A second end of the first branch channel 2161 and a second end of the second branch channel 2162 are communicated with the dirt cup 37 respectively.

According to an embodiment of the present disclosure, the brushroll casing 12 includes a lower casing 125 and an upper casing 124 connected to a top of the lower casing 125, and the first air-suction channel 1221 and the second air-suction channel 1222 are defined by the upper casing 124 and/or the lower casing 125. Referring to FIG. 16, the brushroll casing 12 mainly includes the upper casing 124 and the lower casing 125, in which a lower end of the upper casing 124 is open, the lower casing 125 is detachably connected with the upper casing 124 to close at least a part of the opening of the upper casing 124, and the upper casing 124 and the lower casing 125 define the dust-suction port therebetween. Further, a brushroll air-suction channel 122 and the drive-belt mounting chamber 123 in which the drive belt 13 is mounted are formed between the upper casing 124 and the lower casing 125 and spaced apart from each other along the left-and-right direction. The brushroll air-suction channel 122 includes the first air-suction channel 1221 and the second air-suction channel 1222. The first air-suction channel 1221 and the second air-suction channel 1222 are not communicated with the drive-belt mounting chamber 123 to prevent debris (such as dust) from being drawn into the drive belt 13, so as to guarantee the reliable operation of the system. The structure of the brushroll casing 12 is simple and compact, and the first air-suction channel 1221, the second air-suction channel 1222 and the drive-belt mounting chamber 123 spaced apart from one another are defined by structures of the upper casing 124 and the lower casing 125, which saves redundant pipes to make it simple to manufacture the brushroll casing 12 with a low cost.

The upright vacuum cleaner 1 further includes an air-inlet pipe assembly. The air-inlet pipe assembly mainly includes an air inlet pipe 51 and a hose 52. The air inlet pipe 51 is fixed to the motor housing 21. A first end of the air inlet pipe 51 is communicated with a dirty air outlet 211 in the motor housing 21 and a second end of the air inlet pipe 51 is communicated with a first end of the hose 52. A second end of the hose 52 is communicated with a separating chamber 371 of the dirt cup 37. Advantageously, a length of the hose 52 may be greater than that of the body 31 to prolong a separation time and a filtration time of the dirty air and the dust, and also to increase a dust suction capacity, so as to improve the working efficiency of the upright vacuum cleaner 1. Further, a middle part of the hose 52 may be hanged on the body 31 to provide a compact structure. Alternatively, the hose 52 may be a plastic hose 52 or a rubber hose 52, so as to facilitate coiling up the hose 52 to save space and improve the space utilization rate.

The structure and the operation process of the upright vacuum cleaner 1 according to embodiments of the present disclosure will be described with reference to the accompanying drawings.

As illustrated in FIGS. 1 to 29, the upright vacuum cleaner 1 mainly includes the brush assembly 100, the motor assembly 200, the body assembly 300, a clutch device 400 and a wheel 38.

Figure 28:
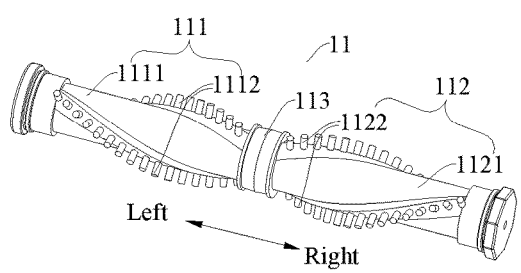
FIG. 28 is a schematic view of a brushroll of an upright vacuum cleaner according to an embodiment of the present disclosure.
Figure 29:
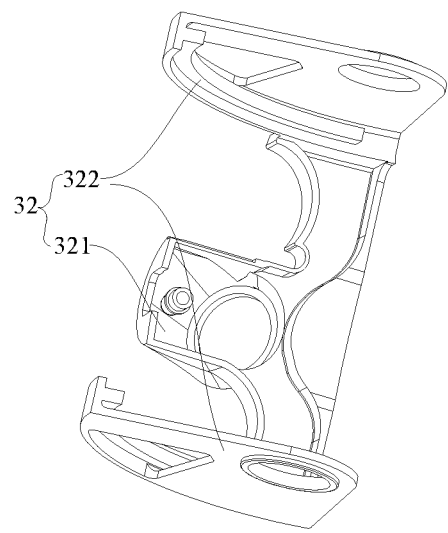
FIG. 29 is a schematic view of a bridging member of an upright vacuum cleaner according to an embodiment of the present disclosure.

The brush assembly 100 mainly includes the brushroll 11 and the brushroll casing 12, and the brushroll casing 12 includes the upper casing 124 and the lower casing 125. The brushroll casing 12 defines the drive-belt mounting chamber 123, and the first air-suction channel 1221 and the second air-suction channel 1222 respectively located at left and right sides of the drive-belt mounting chamber 123. The brushroll 11 is rotatably disposed in the brushroll casing 12, and the drive belt 13 is movably disposed in the drive-belt mounting chamber 123. Further, an end of the drive belt 13 is winded upon a middle part of the brushroll 11. Referring to FIG. 28, the brushroll 11 mainly includes the first brushroll section 111, the second brushroll section 112 and the connecting-shaft section 113 disposed coaxially. The first brushroll section 111 and the second brushroll section 112 are connected with two ends of the connecting-shaft section 113 respectively. The first brushroll section 111 includes a first body 1111 and a first bristle 1112 disposed on the first body 1111, and the second brushroll section 112 includes a second body 1121 and a second bristle 1122 disposed on the second body 1121. The end of the drive belt 13 is winded upon the connecting-shaft section 113 of the brushroll 11. Further, the brushroll casing 12 is also provided with the tensioning wheel 14 to tension the drive belt 13.

Figure 24:
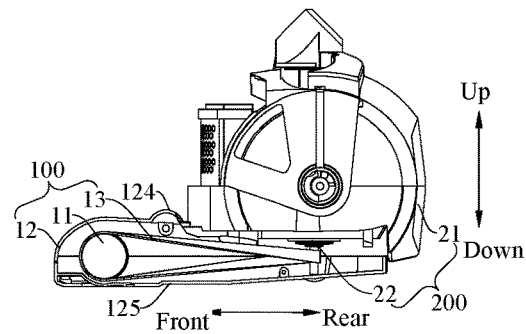
FIG. 24 is a side view of a structure illustrated in FIG. 21.

The motor assembly 200 includes the motor housing 21, the motor 22 and the fan (not illustrated). The motor housing 21 defines a motor air-suction channel 216 and a motor air-exhaust channel spaced apart from each other. The motor housing 21 has a dirty air outlet 211 communicated with the motor air-suction channel 216, and a clean air inlet 212 communicated with the motor air-exhaust channel. The motor 22 is disposed vertically inside the motor housing 21 and is rotatable with respect to the motor housing 21. That is, the motor shaft 221 of the upright vacuum cleaner 1 is arranged along the vertical direction, the motor 22 is disposed behind the brushroll 11 and the motor shaft 221 of the motor 22 is connected with the brushroll 11 via the drive belt 13. Specifically, the first end of the drive belt 13 is fitted over the motor shaft 221 of the motor 22 while the second end of the drive belt 13 is fitted over the brushroll 11. When the motor shaft 221 of the motor 22 rotates, the motor shaft 221 drives the drive belt 13 to move, and the drive belt 13 drives the brushroll 11 to rotate around its own rotating axis. Thus, the motor 22 drives the brushroll 11 to rotate. Referring to FIG. 24, since an axial direction of the motor shaft 221 of the motor 22 is not parallel with an axial direction of the brushroll 11, the drive belt 13 between the brushroll 11 and the motor shaft 221 is twisted for one time with a twist angle of 30° to 90°. Further, the motor 22 may drive the fan to rotate so as to generate a vacuuming airflow to provide a vacuuming power for the upright vacuum cleaner 1, and the motor 22 may also drive the brushroll 11 to rotate around its own axis so as to realize the purpose of cleaning the floor.

The body assembly 300 includes the body 31, the bridging member 32 and the dirt cup 37, in which the dirt cup 37 and the bridging member 32 are mounted to the body 31 respectively. The bridging member 32 is connected with a lower end of the body 31. Each of two side plates 322 of the bridging member 32 is disposed at an outer side of a side wall of the motor housing 21 and rotatably connected with the motor housing 21. Meanwhile, the rotatable wheel 38 is provided at an outer side of each side plate 322 of the bridging member 32, so that it is convenient for the user to push the upright vacuum cleaner 1 when the upright vacuum cleaner 1 operates. The dirt cup 37 defines the separating chamber 371 therein, and includes an air inlet 372 and an air outlet 373 communicated with the separating chamber 371 respectively. The body 31 defines a body air-exhaust channel 311 therein. An air-exhaust pipe 39 is provided between the body 31 and the motor housing 21. Two ends of the air-exhaust pipe 39 are communicated with the body air-exhaust channel 311 of the body 31 and the clean air inlet 212 of the motor housing 21 respectively. The dust and debris sucked through the dust-suction port of the brushroll casing 12 are transmitted into the motor air-suction channel 216 of the motor housing 21 via the first air-suction channel 1221 and the second air-suction channel 1222 respectively, and then flow into the separating chamber 371 of the dirt cup 37 to be filtered. The clean air obtained is discharged to the motor air-exhaust channel of the motor housing 21 from the air outlet 373 of the dirt cup 37, and finally discharged to the outside from an air-exhaust hole 213 of the motor housing 21.

An actuating member of the clutch device 400 is rotatably disposed to the motor housing 21, and is fitted with the bridging member 32 and the motor casing 222 of the motor 22 respectively, such that the bridging member 32 may drive the clutch device 400 to rotate, and thus the clutch device 400 may further drive the motor 22 to rotate.

Referring to FIG. 15, when the upright vacuum cleaner 1 is in the non-working state, the upright vacuum cleaner 1 may be placed upright on the floor, i.e. the body 31 of the upright vacuum cleaner 1 is located at the second upright position, thus occupying a small space. If the user needs to use the upright vacuum cleaner 1, the user may hold a handle of the body 31 by hands to push the upright vacuum cleaner 1 to operate. First, the user may turn on the switch of the upright vacuum cleaner 1, in which case the drive belt 13 is in the loosened state, and the motor 22 cannot drive the brushroll 11 to rotate. That is, the upright vacuum cleaner 1 is in a stand-by state where the brushroll 11 does not sweep dust. Then, the body 31 is rotated from the second upright position to the second oblique position by hands, and in such process, the bridging member 32 on the motor housing 21 rotates clockwise along with the body 31 relative to the motor housing 21, such that the bridging member 32 drives the motor 22 in the motor housing 21 to rotate by driving the clutch device on the motor housing 21. That is, the motor 22 is rotated from the first oblique position to the first upright position. In this process, the lower end of the motor shaft 221 moves backwards gradually, such that the distance between the lower end of the motor shaft 221 and the brushroll 11 is increased, and thus the drive belt 13 is tensioned. Therefore, the motor 22 may drive the brushroll 11 to rotate by the drive belt 13, so as to start the operations of dust sweep and dust suction. Of course, the present disclosure is not limited to this. The user may rotate the body 31 from the second upright position to the second oblique position directly, in which process the drive belt 13 is tensioned gradually, and then the switch of the upright vacuum cleaner 1 is turned on to implement the operations of dust sweep and dust suction simultaneously.

That is, the user just needs to turn on the switch and then manipulate a direction of the handle of the body 31, so as to start or stop the dust sweep with simple manipulations, instead of manipulations on a control interface. Alternatively, the switch may be provided to the handle of the body 31 to facilitate manipulations by hands, or may be provided to the brushroll casing 12 or the motor housing 21 below the body 31 to make it convenient for the user to turn on the switch by feet. The motor 22 may be disposed near the floor. That is, the gravity center of the motor 22 is lower than that of the motor 22 of the vacuum cleaner in the related art, such that among the upright vacuum cleaners having the body 31 of the same length, the upright vacuum cleaner 1 in the present disclosure is easier to manipulate with less effort.

When the upright vacuum cleaner 1 is in the working state, the dirty air and the dust are introduced into the brushroll air-suction channel 122 via the dust-suction port of the brushroll casing 12, then flow into the motor air-suction channel 216 in the motor housing 21, and further discharged into the body assembly 300 via a dirty air output pipe 214 on the motor housing 21. The clean air obtained by filtration of the body assembly 300 enters the motor air-exhaust channel in the motor housing 21 via a clean air input pipe 215 on the motor housing 21. The air-exhaust pipe 39 is disposed between the body 31 and the motor housing 21, and two ends of the air-exhaust pipe 39 are communicated with the body air-exhaust channel 311 of the body 31 and the clean air inlet 212 of the motor housing 21 respectively. The clean air obtained by filtration of the dirt cup 37 is introduced into the motor air-exhaust channel in the motor housing 21 after sequentially passing through the body air-exhaust channel 311, the air-exhaust pipe 39 and the clean air inlet 212, and finally discharged to the outside from the air-exhaust hole 213 of the motor housing 21.

It shall be noted that when the body 31 is rotated from the second upright position to the second oblique position at the predetermined angle, the motor 22 may rotate synchronously along with the body 31. When the body 31 rotates to the predetermined angle, the body 31 may be manipulated freely by hands without any impact on the tensioned state of the drive belt 13. That is, when the motor 22 rotates from the first oblique position to the first upright position, the body 31 may be manipulated freely by hands without affecting the dust sweep and the dust suction of the upright vacuum cleaner 1. Of course, the present disclosure is not limited to this. The rotation angle of the body 31 may be directly associated with the rotation angle of the motor 22, i.e. the position state of the motor 22 may be adjusted through adjusting the oblique angle of the body 31 by hands so as to adjust the tension degree of the drive belt 13.

The other configurations and manipulations of the upright vacuum cleaner 1 according to embodiments of the present disclosure are known to those skilled in the art, which will not be elaborated herein.

Reference throughout this specification to "an embodiment," "some embodiments," "an example," "specific examples" or "some examples" means that a particular feature, structure, material, or characteristic described in connection with the embodiment or example is included in at least one embodiment or example of the present disclosure. Thus, the appearances of the above phrases throughout this specification are not necessarily referring to the same embodiment or example of the present disclosure. Furthermore, the particular features, structures, materials, or characteristics may be combined in any suitable manner in one or more embodiments or examples. Those skilled in the art can integrate and combine different embodiments or examples and the features in different embodiments or examples in the specification.

Although embodiments of the present disclosure have been shown and illustrated, it shall be understood by those skilled in the art that various changes, modifications, alternatives and variants without departing from the principle and spirit of the present disclosure are acceptable. The scope of the present disclosure is defined by the claims or the like.

What is claimed is:

1. An upright vacuum cleaner, comprising:
   a brushroll assembly comprising a brushroll casing and a brushroll disposed in the brushroll casing;
   a motor assembly comprising a motor housing and a motor disposed in the motor housing, the motor being configured to drive the brushroll to roll via a drive belt;
   a body assembly comprising a body and a bridging member mounted to the body, wherein the bridging member is pivotably connected with the motor housing to allow the body to be rotatable between an upright position and an oblique position, and the bridging member is configured to push the brushroll casing to move in a direction running away from the motor housing so as to tension the drive belt, when the body is rotated from the upright position to the oblique position; and
   a gear and rack assembly disposed between the bridging member and the brushroll casing, wherein the bridging member is configured to drive the brushroll casing to move via the gear and rack assembly, wherein
   the gear and rack assembly comprises a gear and a rack, the rack is mounted to the brushroll casing horizontally and extends along a front-and-rear direction, and the gear is mounted to the bridging member vertically and meshed with the rack, wherein the gear comprises:
   an arc rim whose central axis is a pivoting axis of the bridging member; and
   two groups of meshing teeth connected to two ends of the rim respectively.

2. The upright vacuum cleaner according to claim 1, wherein the bridging member comprises a top plate and two side plates connected to two sides of the top plate, and the gear and the side plate are molded integrally.

3. The upright vacuum cleaner according to claim 1, wherein two racks are provided and disposed at two sides of a longitudinal central axis of the brushroll casing symmetrically, and two gears are provided and fitted with the two racks correspondingly.

4. The upright vacuum cleaner according to claim 3, wherein the two racks are both mounted to the brushroll casing via a connecting rod.

5. The upright vacuum cleaner according to claim 4, wherein two connecting rods are provided and respectively connected with the two racks correspondingly, and the two connecting rods are respectively mounted to the brushroll casing independently.

6. The upright vacuum cleaner according to claim 4, wherein one connecting rod is provided and extends along a left-and-right direction, two ends of the connecting rod are connected with front ends of the two racks respectively, and the connecting rod is mounted to the brushroll casing.

7. The upright vacuum cleaner according to claim 1, further comprising:
   an elastic member having two ends connected with the brushroll casing and the motor housing respectively so as to hinder the brushroll casing from moving in the direction running away from the motor housing.

8. The upright vacuum cleaner according to claim 7, wherein two elastic members are provided and disposed at two sides of a longitudinal central axis of the brushroll casing symmetrically.

9. The upright vacuum cleaner according to claim 7, wherein the elastic member is a spring.

10. The upright vacuum cleaner according to claim 1, wherein a rotating axis of the motor and a rotating axis of the brushroll are arranged in a non-parallel manner, and the drive belt is winded upon a motor shaft of the motor and the brushroll.

11. The upright vacuum cleaner according to claim 10, wherein the motor shaft is arranged vertically, the rotating axis of the brushroll is perpendicular to the motor shaft, and the drive belt is twisted by an angle of 90°.

12. The upright vacuum cleaner according to claim 10, wherein the brushroll comprises a first brushroll section provided with bristles, a second brushroll section provided with bristles, and a connecting shaft section connected between the first brushroll section and the second brushroll section, in which the drive belt is winded upon the motor shaft and the connecting shaft section so that the motor drives the brushroll to roll.

13. The upright vacuum cleaner according to claim 12, wherein respective central axes of the first brushroll section, the second brushroll section and the connecting shaft section are located in a same line, and the first brushroll section and the second brushroll section are arranged symmetrically with respect to the drive belt.

14. The upright vacuum cleaner according to claim 12, wherein the brushroll casing defines a mounting chamber, a first air-suction channel and a second air-suction channel, the mounting chamber is configured to accommodate the connecting shaft section and the drive belt therein, and the first air-suction channel and the second air-suction channel are located at two sides of the mounting chamber respectively and separated from the mounting chamber.

15. The upright vacuum cleaner according to claim 14, wherein the first air-suction channel and the second air-suction channel both comprise a lateral air-suction channel section and a longitudinal air-suction channel section, the lateral air-suction channel section extends along an axial direction of the brushroll, and the longitudinal air-suction channel section extends along a direction perpendicular to the axial direction of the brushroll and is communicated with the corresponding lateral air-suction channel section.

* * * * *